Patented Feb. 5, 1929.

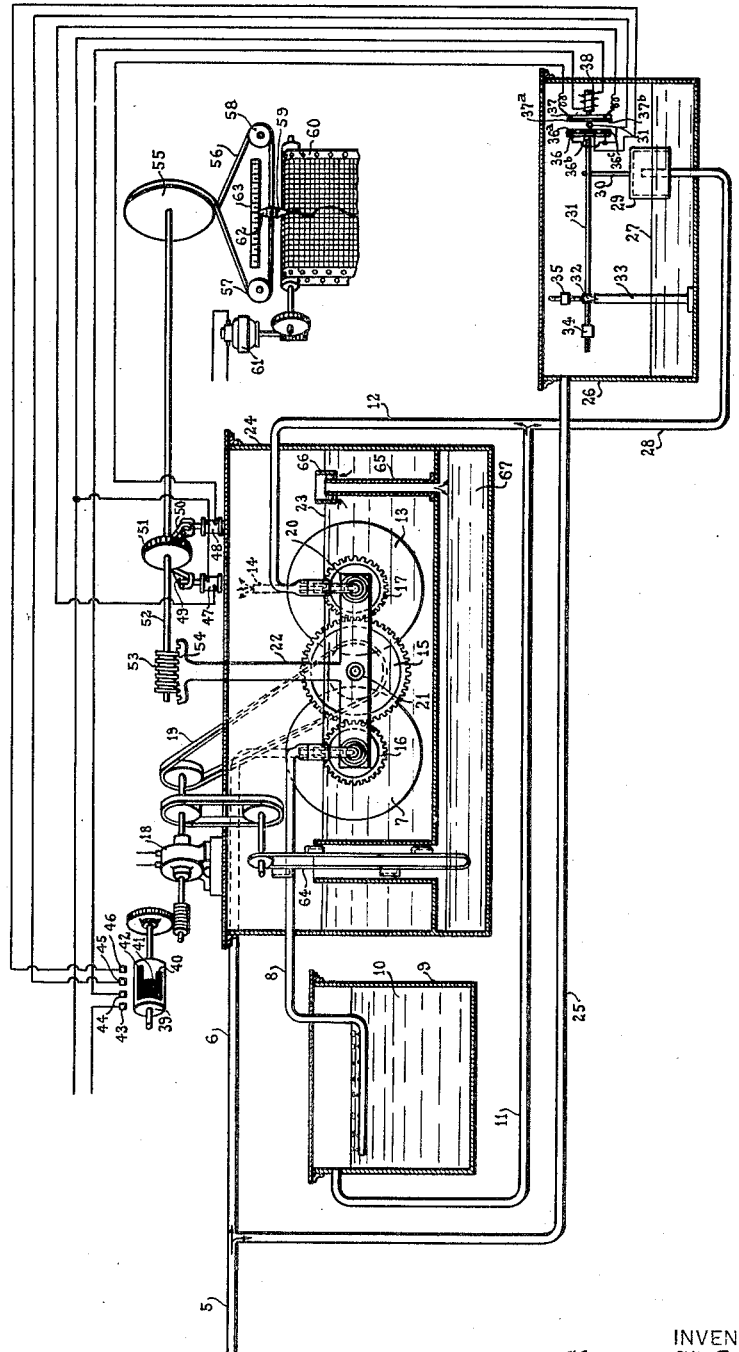

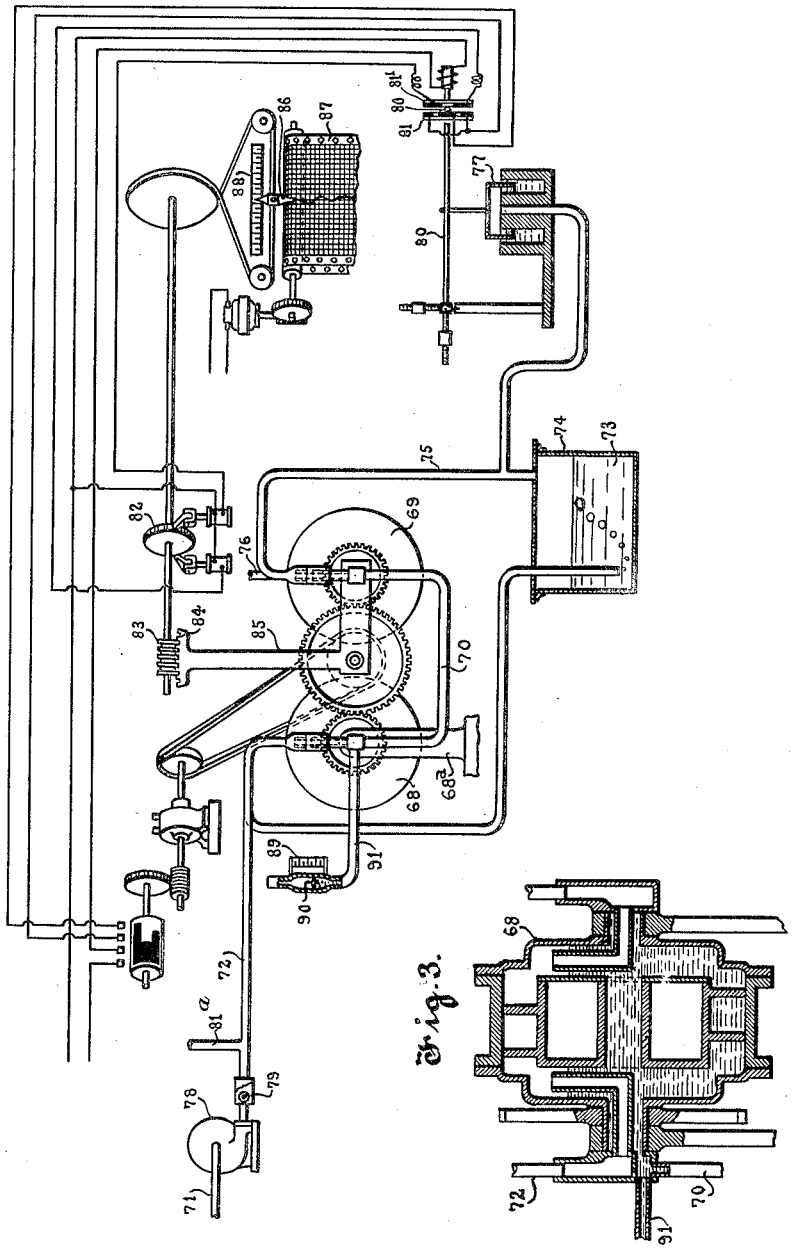

1,700,852

UNITED STATES PATENT OFFICE.

HORACE N. PACKARD, OF WAUWATOSA, AND EDWIN X. SCHMIDT, OF MILWAUKEE, WISCONSIN, ASSIGNORS TO THE CUTLER-HAMMER MFG. CO., OF MILWAUKEE, WISCONSIN, A CORPORATION OF WISCONSIN.

METHOD OF AND APPARATUS FOR ASCERTAINING THE PROPORTION OF CONSTITUENTS OF FLUIDS.

Application filed September 26, 1923. Serial No. 664,937.

This invention relates to methods of and apparatus for ascertaining the proportion of a constituent of a fluid, and while not limited thereto is more particularly advantageous for measuring and recording the proportion of carbon dioxid in combustion gases.

In the operation of a boiler plant, or any extensive plant where fuel is burned it is essential for efficient operation to maintain a fairly definite percentage of carbon dioxid in the combustion gases. For this reason it is desirable to have an indicator or recorder to show continuously the percentage or proportion of carbon dioxid in such gases. It has heretofore been proposed to measure at intervals the proportion of carbon dioxid in samples of the combustion gases. Obviously there may be considerable variation in the carbon dioxid content of the combustion gases between such intervals which will not be accounted for. Such intermittently operated devices are also objectionable because the exact proportion of carbon dioxid cannot possibly be determined except at one point in each intermittent cycle of operation, that is, at the end thereof.

One object of our invention is to provide an improved method and apparatus for accurately determining the proportion of a constituent of a fluid.

Another object is to provide an apparatus by which such determination or measurement may be made in a continuous manner.

Another object is to provide a method and apparatus by which the aforementioned determinations may be accomplished in a simple and efficient manner.

Another object is to provide a method and apparatus for continuously comparing two volumes, either or both of which may be variable.

Another object is to provide a method and apparatus whereby the volumetric proportion of a constituent of a fluid will be accurately indicated and recorded at all times during the operation thereof.

Various other objects and advantages of the invention will hereinafter appear.

The invention will now be more specifically described, reference being had to the accompanying drawing which diagrammatically and schematically illustrates certain embodiments thereof, it being understood that various other forms of apparatus may be employed without departing from the spirit and scope of the invention as defined in the appended claims.

In the drawing,

Figure 1 illustrates one form which the invention may assume in practice;

Fig. 2 illustrates a modified form of apparatus for carrying out the present invention, while, Fig. 3 is an enlarged detail sectional view of one of the fluid pumps.

Referring to Fig. 1 of the drawing, there is shown a conduit or pipe 5 through which a fluid, such as a continuous sample of the combustion gases from a furnace or the like is carried. Said fluid is led through a pipe 6 to the inlet side of displacement meter or pump 7 through which it passes and is discharged therefrom into a pipe 8 leading to a receptacle 9 containing a caustic solution 10 or other suitable means for removing a constituent or constituents, such as carbon dioxid, from said fluid. After passing through said solution the fluid passes through pipes 11 and 12 to the inlet side of a second meter or pump 13 from which it is discharged through pipe 14 into the atmosphere or otherwise suitably disposed of.

The pumps or meters 7 and 13, preferably of normally equal capacity, are driven at the same speed through a gear 15 engaging gears 16 and 17 on the respective pumps, said gear 15 being driven, preferably at constant speed, by a motor 18 or the like through a suitable connection, such as the belt 19. It will be apparent from the operation thus far described that the pressure of gas at the inlet side of pump 13 will tend to be reduced with respect to the intake pressure at pump 7, due to the removal of a constituent or constituents of the combustion gases when passed through the solution 10. However, for the purposes of our invention it is desirable to maintain equal intake pressures in the pumps 7 and 13. This is accomplished by providing a support 20 to which the pumps 7 and 13 are attached, said support being pivoted at the point 21 intermediate the pumps 7 and 13. The support 20 is provided with an arm 22 for tilting the same to raise one of the pumps 7 or 13 while lowering the other pump with respect to the level of a liquid 23, such as water, within a tank 24 in which the pumps are supported. Thus by moving the lever 22, as shown in Fig. 1 to the right the pump 13 will be lowered and the pump 7 raised with respect to the level of the liquid 23 whereby the intake pressure of the pump 13 will be increased an amount sufficient to compensate for the decrease in pressure occasioned by the removal of the constituent or constituents from the fluid undergoing test. That is to say, the present device is so arranged as to provide equal inlet pressures for both pumps under all conditions. Also the value of any adjustments so made are proportional to the change in value of the content of carbon dioxid or the like in such fluid, whereby the former value may be utilized as a measure of the latter.

It is herein proposed to provide for so varying and controlling the degree of immersion of said pumps automatically and to indicate and also record continuously the value of any adjustments so made, to thereby measure the value of a particular constituent of the fluid involved. To such end a by-pass pipe 25 connects the pipe 5 with the upper portion of a closed receptacle 26 having a quantity of water or other liquid 27 therein, and connecting the conduit 11 with the lower portion of the receptacle 26 is a by-pass pipe 28 which opens within a pressure responsive device shown herein as a prover-bell 29, which is of inverted cup shape, having the lower edge thereof below the level of the liquid 27. Said prover-bell is suspended by a rod 30 from a contact member 31 having a knife-edge pivotal engagement at 32 with a support 33. Said member 31 is provided with adjusting means 34 and 35 for normally balancing said prover-bell with respect to the water level 27 when the pressures within and without said bell are equal.

In the operation of the present device, however, upon continuous removal of a variable content of a constituent of the fluid undergoing test the intake pressure of pump 13 will vary with respect to the intake pressure of pump 7, which will therefore unbalance the pressures upon the inside and outside of the prover-bell 29, and will cause the latter to move vertically up or down with respect to the water level 27 in accordance with variations in the proportion of the constituent removed from the fluid. Such movement of the prover-bell 29 will cause like movement of the member 31 with respect to associated members 36 and 37. Said member 31 is adapted to be intermittently clamped between members 36 and 37 by means of a solenoid 38 controlled by a contactor drum 39 driven by the motor 18. The member 36 is provided with contacts $36^a$, $36^b$ and $36^c$ and the member 37 is provided with contacts $37^a$ and $37^b$; the arrangement being such that the member 31 when displaced vertically from its intermediate neutral position is adapted when clamped to bridge a given pair of contacts of the members 36 and 37. The drum 39 has contact segments 40, 41 and 42 adapted for engagement with co-operating contacts 43 to 46, inclusive. Thus, assuming the prover-bell 29 to be in neutral or balanced position, the intermittent operation of the solenoid 38 for clamping the contact 31 between the members 36 and 37 will have no effect upon the operation of the other parts of the device. However, upon slight reduction of the pressure within the prover-bell 29, the same will be caused to drop, thus also lowering the contact member 31 with respect to the members 36 and 37, and when said members are brought into engagement by the operation of the solenoid 38 a circuit is established through the contact $36^b$, contact 46 of the drum 39 and co-operating contact segment 42 with one side of the line, and through contact $37^b$ and left hand solenoid 47 with the other side of the line. Pawl 49 of solenoid 47 is thus actuated to move a ratchet wheel 51 one notch in a direction to cause a slight rotation of shaft 52 and corresponding movement of worm gearing 53 and 54 to tilt frame 20 and lower the pump 13 with respect to the level of the water 23, while raising the pump 7 above said level a corresponding amount. However, if the prover-bell 29 should fall to a lower position on account of a larger difference in the pressures within and without the same, so that contact member 31 is directly opposite contact $36^c$, the ratchet wheel 51 would be moved two notches by the left hand solenoid 47, as the latter would be actuated twice during one revolution of the drum 39, due to engagement of contact 45 with contact segments 42 and 40. A similar operation of the right hand solenoid 48 will result upon movement of the prover-bell 29 above neutral or balanced position. Inasmuch as the ratcheting device and contact drum herein shown are of conventional form, further description thereof will be unnecessary.

Also secured to the shaft 52 is a grooved wheel 55 adapted to receive a flexible member 56 which is preferably endless and adapted to pass around wheels or guides 57 and 58. Attached to said member 56 between the wheels 57 and 58 is a recording stylus or the like 59 adapted for contact with a suitable recording sheet or tape 60, driven at a constant rate by a motor 61 or the like. The recording sheet 60 may be suitably calibrated to provide for automatically indicating and recording thereon the proportion or percentage of the constituent removed from the combustion gases during passage thereof from the pump 7 to the pump 13. The stylus 59 is preferably provided with a pointer 62 co-operating with a suitably calibrated scale 63 to indicate the volumetric proportion of the constituent removed, whether or not a recording tape 60 is employed.

Obviously, if the prover-bell 29 is unbalanced at the time of the next operation of the solenoid 38, a contact on the member 36 will be electrically connected with a contact on the member 37 to cause one or more reciprocations of either of the pawls 49 or 50 to cause the required tilting movement of the support for the pumps 7 and 13 to provide equal intake pressures therein.

A chain and bucket device 64 may also be driven by the motor 18, for supplying a quantity of water to the tank 24 to compensate for evaporation of the water or other losses, and co-operating with means comprising a weir 65 for maintaining a constant water level, said weir being provided with a collar or shield 66 to require the water to seek the true level thereof before being discharged into the lower compartment 67 of receptacle 24, thus overcoming inaccuracies in the water level due to ripples or waves.

In Fig. 2 is shown a modified form of apparatus, having a pair of displacement pumps or meters 68 and 69 partially filled with a liquid, preferably mercury. A flexible pipe or conduit 70 provides a communicating passage between the bodies of mercury in the respective pumps. In this construction the pump 68 is provided with a stationary support 68$^a$, whereas the pump 69 is adapted to be raised or lowered to vary the relative capacities of the pumps to maintain equal intake pressures therein. Pipes 71 and 72 are adapted to carry the fluid undergoing test to and through pump 68 and to discharge the same into a solution 73 within a closed receptacle 74 to remove a particular constituent therefrom, such as carbon dioxid.

From the receptacle 74 the remaining combustion gases are led by a pipe 75 to and through pump 69 and discharged through pipe 76 into the atmosphere or otherwise suitably disposed of. Since pumps 68 and 69 at the beginning of the operation are set to pump equal volumes, a vacuum or drop in pressure will tend to occur in the line between said pumps, the inside of prover-bell 77 communicating with pipe 75 to subject said prover-bell to the intake pressure conditions obtaining at pump 69. If the volumetric proportion of the removed constituent decreases during the operation the intake pressure of pump 69 will increase with respect to that of pump 68 and the pressure responsive device will act to raise pump 69 to decrease the intake pressure thereof until the same is equal to the intake pressure of pump 68.

Means are also provided for supplying the fluid to pump 68 at atmospheric pressure, said means comprising a blower 78 of ordinary construction, a barrier 79 located within pipe 72 and provided with a reduced opening, and a branch pipe 81$^a$ connecting pipe 72 directly with atmosphere. In operation the barrier restricts the flow of fluid therebeyond to a value which is able to escape through pipe 81$^a$ without raising the pressure on the right hand side of said barrier above atmospheric pressure, whereas the outward flow of fluid through pipe 81$^a$ prevents induction of atmospheric air into the pump 68.

Inasmuch as the fluid is admitted to the pump 68 at atmospheric pressure, the outside of prover-bell 77 may be subjected to atmospheric pressure and any movement of said prover-bell from balanced position will cause a similar movement of member 80 with respect to members 81 and 81' to provide for movement of ratchet wheel 82 to drive the worm gearing 83 and 84 in one direction or the other, in a manner similar to that described in connection with Fig. 1. Since only one of the pumps, 69, is raised or lowered upon movement of lever 85, it will be apparent that such raising or lowering will result in lowering or raising, respectively, the height of the mercury therein; the height of the mercury in pump 68 being varied inversely a like amount.

While we have shown a recording device comprising stylus 86 and tape 87 and an indicating scale 88 like those shown in Fig. 1, we also preferably provide a device 89 for continuously indicating the volumetric proportion of the carbon dioxid or other constituent removed from the combustion gases or the like. This device comprises a column of mercury 90 connected at one side through pipe 91 with the body of mercury in pump 68 to indicate the level of mercury in the latter, the scale 89 being so calibrated as to indicate at all times the volumetric proportion of the constituent removed from the fluid. The column of mercury 90 is subjected at the other side thereof to atmospheric pressure.

In Fig. 3 is shown an enlarged detail sectional view of the pump 68 and the pipe connections therefor, it being understood that the pump 69 is similarly constructed to have a normally equal capacity, whereas pump 68 has the additional pipe connection 91 leading to the indicator 89.

It will also be understood that those parts in Fig. 2 not specifically described are in all substantial respects like corresponding parts in Fig. 1 and have similar functions. Furthermore, while we have shown the device in Fig. 2 as adapted to operate on fluid at atmospheric pressure, it will be apparent to those skilled in the art that the device illustrated in Fig. 1 may be similarly provided with means for supplying fluid at atmospheric pressure, thus obviating the necessity for closed receptacle 26 and communicating pipe 25. Also the device of Fig. 1 may be provided with means for raising and lowering but one of the fluid pumps, or the pumps 7 and 13 may be provided with communicating bodies of mercury instead of employing the tank 24 with liquid therein at a constant level.

What we claim as new and desire to secure by Letters Patent is:

1. The method of ascertaining the volumetric proportion of a constituent of a flow of fluid, which comprises introducing said fluid into receptacles of normally equal capacity before and after removal of said constituent therefrom, regulating the relative capacities of said receptacles to maintain equal measurement pressures therein irrespective of variations in proportion of such constituent, and indicating continuously the values of the regulation so effected.

2. The method of ascertaining the proportion of a constituent of a fluid which comprises removing said constituent, equalizing the pressures of said fluid before and after such removal, and continuously measuring the volumetric change required to effect such equalization.

3. The method of ascertaining the volumetric proportion of a constituent of a fluid flow, which comprises separating said constituent from said fluid while maintaining substantially constant the pressure of said fluid before and after such separation, and utilizing the volumetric change required to provide said constant pressure to indicate the proportion of said constituent.

4. The method of ascertaining the volumetric proportion of a fluid constituent, which comprises passing the fluid through pumps of normally equal capacity, removing said constituent from said fluid after passage through one of said pumps, and varying the relative capacities of said pumps to maintain said fluid at substantially constant pressure during passage through said pumps.

5. Apparatus for ascertaining the volumetric proportion of a constituent of a flow of fluid, comprising receptacles of normally equal capacity into which said fluid is introduced before and after removal of said constituent therefrom, means for varying the relative capacities of said receptacles to compensate for variation in pressure of said fluid due to removal of said constituent, and means for indicating the proportional difference in capacities of said receptacles.

6. Apparatus for continuously determining the proportion of a gas combined with other gas or gases, comprising a pair of continuously operated fluid pumps, a conduit connecting said pumps, means in said conduit for absorbing said first mentioned gas, and means for regulating the capacities of said pumps to maintain the pressure conditions therein substantially constant under conditions of variation in proportion of said first mentioned gas.

7. In apparatus for determining the proportion of a constituent of a fluid, the combination with means for removing said constituent from said fluid, of means comprising a pair of pumps of normally equal capacity for receiving said fluid before and after removal of said constituent, means controlled by the change in pressure in said fluid resulting from such removal of said constituent to vary the relative capacities of said pumps, and means controlled by said capacity varying means to indicate directly the proportion of said constituent.

8. In apparatus for determining the proportion of a constituent of a fluid, the combination with means for removing said constituent from said fluid, of means comprising a pair of pumps of normally equal capacity for receiving said fluid before and after removal of said constituent, a pressure responsive device, means controlled by said device for changing the relative capacities of said pumps to provide substantially equal pressures therein, and associated means for indicating said change in relative capacities.

9. In apparatus for determining the proportion of a constituent of a fluid, the combination with means for removing said constituents from said fluid, of means comprising a pair of pumps of normally equal capacity to act upon said fluid before and after removal of said constituent, a device responsive to differences in pressure within said pumps, electro-responsive means controlled by said device for changing the relative capacities of said pump to provide substantially equal pressures therein, and means controlled by said electro-responsive means for indicating the proportion of said constituent.

10. In apparatus for determining the proportion of a constituent of a fluid, the combination with means for removing said constituent from said fluid, of means comprising pumps of normally equal capacity to act upon said fluid before and after removal of said constituent, a device responsive to pressure conditions of said pumps, electro-responsive means controlled by said device for varying the relative capacities of said pumps to produce substantially equal pressures therein, and means for utilizing said change in relative capacities as a measure of the proportion of said constituent.

11. In apparatus for ascertaining the proportion of a constituent of a composite flow of fluid, the combination with means for removing said constituent from said flow of fluid of means comprising pumps of normally equal capacity to act upon said fluid before and after removal of such constituent, a device responsive to the resultant differential of pressures of the pumps, electro-responsive means controlled by said pressure responsive device to equalize the intake pressures of said pumps, and means controlled by the action of said pressure responsive device for indicating the proportion of said constituent.

12. Apparatus for determining the proportion of carbon dioxid in combustion gases, comprising a pair of fluid pumps of equal capacity, a conduit connecting said pumps through which said combustion gases are adapted to pass, means in said conduit to remove carbon dioxid from said combustion gases, pressure responsive means for varying the relative capacities of said pumps to maintain equal intake pressures therein and means controlled by said pressure responsive device to indicate the proportion of carbon dioxid in said combustion gases.

13. Apparatus for determining the proportion of carbon dioxid in combustion gases, comprising a pair of pumps positively driven by a common drive adapted to receive said gases respectively before and after removal of carbon dioxid therefrom, and means responsive to variation in pressure of said gases due to such removal for varying the relative capacities of said pumps to maintain equal measurement pressures therein.

14. Apparatus for determining the proportion of carbon dioxid in combustion gases, comprising a pair of pumps positively driven by a common drive adapted to receive said gases respectively before and after removal of carbon dioxid therefrom, and means responsive to variation in pressure of said gases due to such removal for varying the relative capacities of said pumps to maintain equal measurement pressures therein irrespective of variation in speed of said common drive.

15. In a device of the character described, the combination with a pair of communicating pumps positively driven at constantly proportional speeds, means for supplying fluid to one of said pumps at substantially atmospheric pressure, means for removing a constituent of said fluid prior to passage thereof through the other of said pumps, and means for varying the relative capacities of said pumps to maintain substantially equal pressures therein.

16. Apparatus for determining the proportion of a constituent of combustion gases, comprising a pair of fluid pumps, means for passing unaltered combustion gases through one of said pumps, a conduit connecting said pumps, means in said conduit for removing said constituent from the combustion gases, means for varying the capacities of said pumps in accordance with the difference in volumes of said combustion gases at like pressures before and after removal of said constituent therefrom, and means for recording said difference in volumes.

17. Apparatus for determining the proportion of carbon dioxid in combustion gases, comprising a pair of fluid pumps, means for passing unaltered combustion gases through one of said pumps, a conduit connecting said pumps, means in said conduit for removing carbon dioxid from said combustion gases, means for varying the capacities of said pumps in accordance with the difference in volumes of said combustion gases at like pressures before and after removal of carbon dioxid therefrom, and means for continuously indicating and recording the decrease in volume of said combustion gases.

18. Apparatus for ascertaining the proportion of a constituent of a fluid, comprising a pair of pumps, a body of liquid in each of said pumps, means for passing said fluid unaltered through one of said pumps, a conduit connecting said pumps, means in said conduit for removing said constituent from the fluid, means for varying the relative amounts of liquid in said pumps in accordance with the decrease in volume of said fluid at a given pressure upon removal of said constituent, and means controlled by said last mentioned means to indicate said decrease in volume.

19. Apparatus for ascertaining the volumetric proportion of a constituent of a fluid, comprising a displacement pump partially filled with liquid, means for passing said fluid through said pump, means for separating said constituent from said fluid after passage through said pump, means for passing the remaining constituents of said fluid through another pump of equal capacity, means for varying the relative capacities of said pumps to maintain equal pressures therein, and means for utilizing said capacity varying means to indicate the volumetric proportion of said constituent.

20. Apparatus for ascertaining the volumetric proportion of a constituent of a fluid, which comprises a plurality of pumps of normally equal capacity operating at fixed relative speeds into which said fluid is introduced respectively before and after removal of said constituent therefrom, means for varying the relative capacities of said pumps to maintain equal meaurement pressures therein, and means for indicating continuously the values of the variation so effected.

In witness whereof, we have hereunto subscribed our names.

HORACE N. PACKARD.
EDWIN X. SCHMIDT.